US012200490B2

United States Patent
Hennebert (10) Patent No.: US 12,200,490 B2
(45) Date of Patent: Jan. 14, 2025

(54) METHOD FOR PROVISIONING KEYS IN A NETWORK OF CONNECTED OBJECTS

(71) Applicant: COMMISSARIAT A L'ENERGIE ATOMIQUE ET AUX ENERGIES ALTERNATIVES, Paris (FR)

(72) Inventor: Christine Hennebert, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 270 days.

(21) Appl. No.: 17/826,429

(22) Filed: May 27, 2022

(65) Prior Publication Data

US 2023/0007482 A1 Jan. 5, 2023

(30) Foreign Application Priority Data

May 27, 2021 (FR) .................................... 21 05497

(51) Int. Cl.
*H04W 12/069* (2021.01)
*H04L 9/08* (2006.01)
*H04L 9/32* (2006.01)
*H04W 12/04* (2021.01)

(52) U.S. Cl.
CPC ......... *H04W 12/069* (2021.01); *H04L 9/0855* (2013.01); *H04L 9/0894* (2013.01); *H04L 9/3239* (2013.01); *H04W 12/04* (2013.01)

(58) Field of Classification Search
CPC .. H04W 12/069; H04W 12/04; H40L 9/0855; H40L 9/0894; H40L 9/3239
USPC ........................................................... 726/3
See application file for complete search history.

(56) References Cited

U.S. PATENT DOCUMENTS

| | | | |
|---|---|---|---|
| 2011/0119489 A1* | 5/2011 | Garcia Morchon | H04L 63/062 713/169 |
| 2016/0134621 A1* | 5/2016 | Palanigounder | H04W 12/35 713/156 |
| 2017/0310485 A1 | 10/2017 | Robbins et al. | |
| 2019/0332774 A1* | 10/2019 | Nix | H04W 12/50 |
| 2022/0400006 A1* | 12/2022 | Hunsberger | H04W 12/041 |

OTHER PUBLICATIONS

French Preliminary Search Report issued Jan. 18, 2022 in French Application 21 05497 filed on May 27, 2021, 2 pages (with English Translation of Categories of Cited Documents).
Wang, "Comparison and Evaluation of Industrial Wireless Sensor Network Standards ISA100.11a and WirelessHART", 2011, 97 pages.

* cited by examiner

Primary Examiner — Michael S McNally
(74) Attorney, Agent, or Firm — Oblon, McClelland, Maier & Neustadt, L.L.P.

(57) ABSTRACT

A method provisions keys in a network of connected objects, including a plurality of such objects as well as a programming station. The nodes of the network could communicate over a main channel and over a secure auxiliary channel, distinct from the main channel. After a first phase of authentication and mutual identification with the nodes of the network, a terminal including a secure hardware element, broadcasts, in a second phase, a set of secret keys to each node, via the auxiliary channel, the set of secret keys including a first secret key intended to authenticate the nodes belonging to the network and a second secret key, intended to encrypt the exchanges over the main channel. In a third phase, the programming station performs a discovery of the nodes of the network.

10 Claims, 9 Drawing Sheets

METHOD FOR PROVISIONING KEYS IN A NETWORK OF CONNECTED OBJECTS

TECHNICAL FIELD

The present invention relates to the general field of wireless sensor networks or WSNs. In particular, it finds application in the field of smart home and more generally of home automation.

PRIOR ART

A smart home involves networks of objects such as sensors and actuators, connected to the Internet. The sensors may measure physical quantities such as the pressure, the temperature, the contact, the presence of gas, the light in the visible or the infrared, etc. and the actuators may act on the environment by controlling a switch, the closure or the opening of a gate, roller shutters, by modifying a setpoint temperature, by unlocking a door, etc.

In general, the network of connected objects further comprises a programming station used to transmit commands to said objects and enabling the installer or the user to monitor the network. Depending on the used communication protocol, the topology of the network may be a mesh network or a star network.

Such a network of connected objects is in the form of a local network connected to the Internet via a gateway. In general, the communication protocols within this network are proprietary but could alternatively use standards such as ZigBee or 6LowPAN based on low-consumption (physical and link) low layers of IEEE 802.15.4.

The function of the gateway is to pass on data and/or commands between a server of the Cloud and the sensors/actuators of the network. While the communication between the gateway and the server is secure, the data transmission within the network of connected objects is not necessarily so.

In order to protect the connected objects against attacks, aiming for example in the context of home automation to take control of an actuator, it is necessary to encrypt the communications within the network of connected objects.

To this end, it is possible to use secure pairing techniques between devices based on a Diffie-Hellman protocol to share a symmetrical key. Nonetheless, this supposes that the connected objects are provided with enough capabilities to perform asymmetrical elliptic-curve cryptographic computations, which is not the case in general.

Other techniques could allow sharing a common secret key like that of the secure multi-party computing or MPC (Multi Party Computing) enabling a plurality of pairs to agree on a common result. Nonetheless, the latter can be implemented only for a unique communication channel.

An objective of the present invention is to provide a method for provisioning keys within a network of connected objects enabling these to securely communicate. A secondary objective of the present invention is to provide a method for provisioning keys which is simple and robust, in particular in case of addition or replacement of a connected object, and in case of change of the owner of the network.

DISCLOSURE OF THE INVENTION

The present invention is defined by a method for provisioning keys in a wireless network whose nodes comprise a programming station and a plurality of connected objects, characterised in that it implements a terminal including a secure hardware element in which secret keys are stored, the different nodes of the network being able to communicate over a main channel and over an auxiliary channel, distinct from the main channel, said terminal being able to communicate with the different nodes of the network only over the auxiliary channel, said method comprising:

a first phase during which the terminal and each node of the network authenticate and mutually identify themselves via the auxiliary channel by means of a public key of the manufacturer;

a second phase during which the terminal securely distributes a set of secret keys to the different nodes of the network, said set of secret keys comprising a first secret key AuthN), intended to authenticate the nodes belonging to the network and a second secret key (ConfN) intended to encrypt exchanges over the main channel;

a third phase during which the programming station discovers the network by means of a discovery message broadcast to the connected objects, the discovery message being authenticated by means of the first secret key and, in case of successful authentication of said message by a connected object, sending of an acknowledgment message to the programming station, encrypted by the second secret key.

According to a first embodiment of the invention, each node is equipped with a first antenna adapted to emit and receive over the principal channel and with a second antenna adapted to emit and receive over the auxiliary channel, the propagation over the auxiliary channel having a range substantially shorter than the propagation over the main channel.

Advantageously, the terminal, resp. each node of the network, is provided with a unique identifier of the manufacturer and embeds a binary code, said binary code being hashed by means of a hash function, the result of hashing being concatenated with said unique identifier, the whole being signed by a private key corresponding to the public key of the manufacturer and the signed result being stored in the terminal, resp. node in the form of a signed identifier, and that, in the first phase, the terminal transmits its signed identifier to each node of the network, the node authenticating the terminal from the signed identifier of the terminal and from said public key of the manufacturer and that, conversely, each node transmits its signed identifier to the terminal, the terminal authenticating each node from the signed identifier of the node and from said public key of the manufacturer.

In case of success of authentication of the terminal by a node, the identifier of the terminal is stored in an EEPROM memory of this node.

In the second phase, the terminal transmits, via the auxiliary channel, said set of secret keys to each node and that, in the case where the identifier of the terminal is stored in the node, the latter stores said set of secret keys in the EEPROM memory of the node and switches its emitter/receiver to the main channel.

According to a second embodiment, the auxiliary channel between the station and each node is encrypted by means of a symmetrical link key obtained from an ephemeral session key, of the identifier of the terminal as well as the identifier of said node.

The ephemeral session key could then be obtained by means of a Diffie-Hellman exchange between the terminal and the programming station.

Preferably, in the second phase, the terminal transmits, in a first step, said set of secret keys to the programming station, said set of secret keys being encrypted by means of the ephemeral session key.

In the second phase, the terminal advantageously transmits, in a second step, said set of secret keys to each node, said set of secret keys being encrypted by means of the symmetrical link key associated to the terminal and to this node, said symmetrical link key being obtained as a hash of the ephemeral key concatenated with the unique identifier of the terminal and with the unique identifier of the node.

Irrespective of the embodiment, in the third phase, when a node successfully authenticates a discovery message emitted by the programming station, it sends to it an acknowledgement message signed by the second secret key, the programming station then storing the identifier of said object in its local memory after having decrypted it with the second secret key.

BRIEF DESCRIPTION OF THE FIGURES

Other features and advantages of the invention will appear upon reading a preferred embodiment of the invention, described with reference to the appended figures wherein.

DESCRIPTION OF THE EMBODIMENTS

Next, a network of connected objects will be considered, as example and without prejudice to generalisation, in a home automation context. Nonetheless, a person skilled in the art should understand in the description of the embodiments that the method for provisioning keys according to the present invention could apply to any network of connected objects that should operate in a secure manner, for example to an industrial network of connected objects (IIoT or Industrial IoT).

Figure 1:
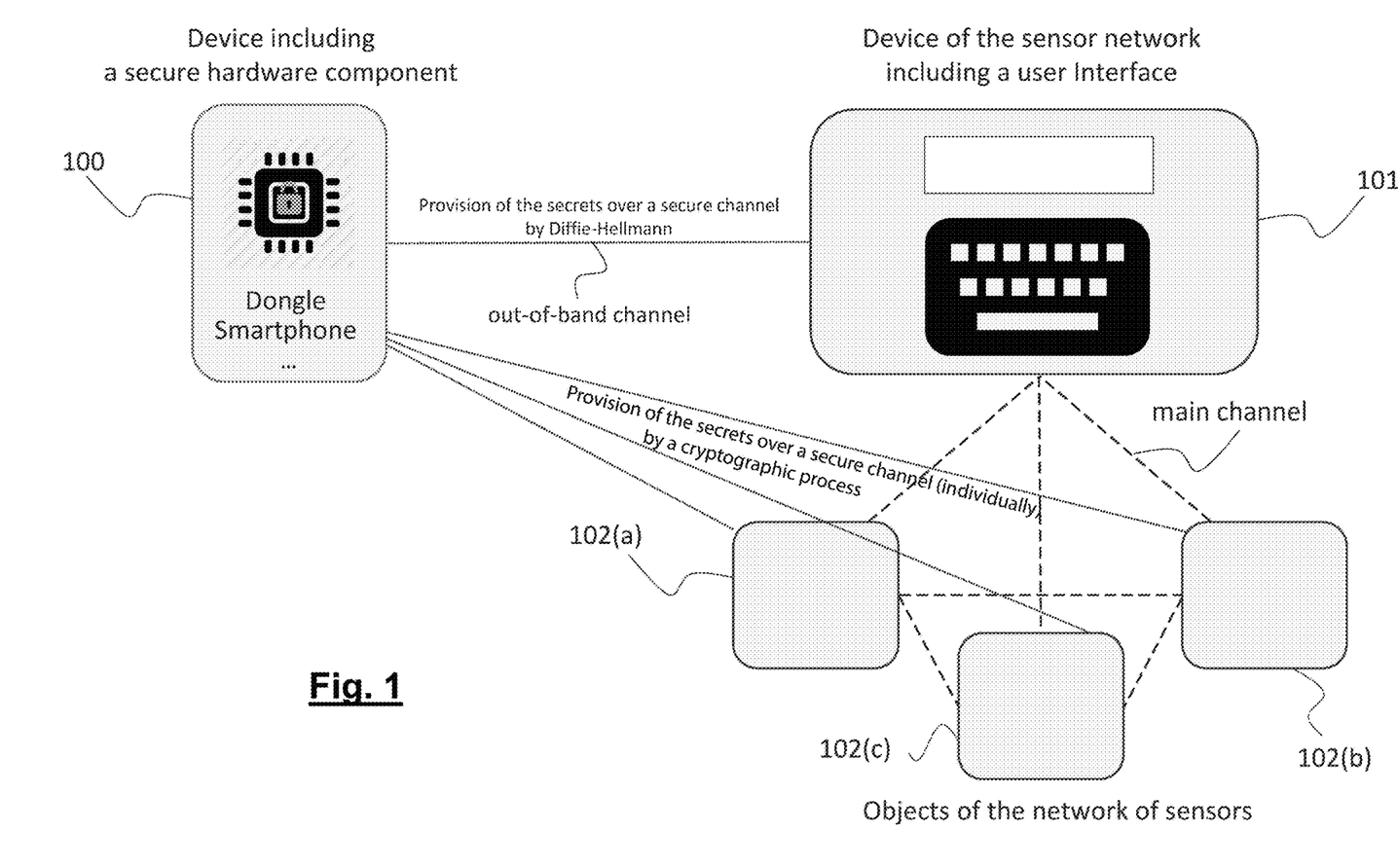
FIG. 1 schematically represents an example of a network of connected objects to which the method for provisioning keys according to the present invention could be applied.

FIG. 1 schematically represents an example of a network of connected objects in the home automation field.

A secure communication terminal, 100, external to the network, for example a dongle or else a smartphone provided with a dedicated application. This terminal includes a secure hardware area or SE (Secure Element) in which secret keys are stored. It allows provisioning the secret keys in the network, in other words distributing these keys to the different nodes of the network, as described later on. In the next description, we will assume, without prejudice to generalisation, that this terminal is a dongle.

The network comprises a programming station, 101, provided with a user interface to parameterise the connected objects and monitor the operation of the network.

In general, the connected objects themselves (102a, 102b, 102c) are sensors or actuators which could emit data to and/or receive data originating from an IP gateway (not represented) connected to the Internet. The IP gateway may be integrated into the programming station.

The different nodes of the network (programming station, connected objects) are provided with a radio main channel (main channel) by means of which the different nodes of the network could transmit useful data once the network is configured.

The nodes of the network are further provided with an auxiliary channel (out-of-band channel), distinct from the main channel, allowing distributing secret keys used for the authentication of the nodes and for securing the communications within the network.

According to a first embodiment, the auxiliary channel uses a distinct physical layer, based on a short-range propagation (NFC, VLC, LiFi, ultrasound channel, for example).

The embedded software in the nodes should then be capable of switching from one physical layer to another and, where appropriate, from a protocol stack to another.

According to a second embodiment, the auxiliary channel is obtained by configuring the physical layer of the main channel so as to reduce the range of the propagation. The software embedded in the nodes should then be capable of quickly switching the configuration of the physical layer of the used standard (typically IEEE 802.15.4).

The different nodes of the network are described in more details hereinafter.

Figure 2:
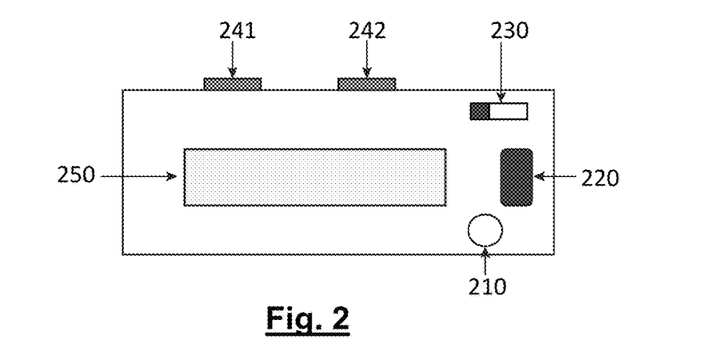
FIG. 2 represents a secure dongle allowing provisioning keys in the network of connected objects of FIG. 1.

FIG. 2 schematically represents an example of a secure dongle which could be used in the network of FIG. 1.

This dongle, powered by a battery, 210, is equipped with an emitter/receiver, 220, only capable of emitting and receiving over the auxiliary channel (for example NFC or ultrasound), a start-up button, 230, and one or two button(s), 241, 242 allowing in particular making words or commands scroll on the screen, 250.

The dongle has a protocol stack enabling it to establish a communication over the auxiliary channel with each node of the network.

Figure 3:
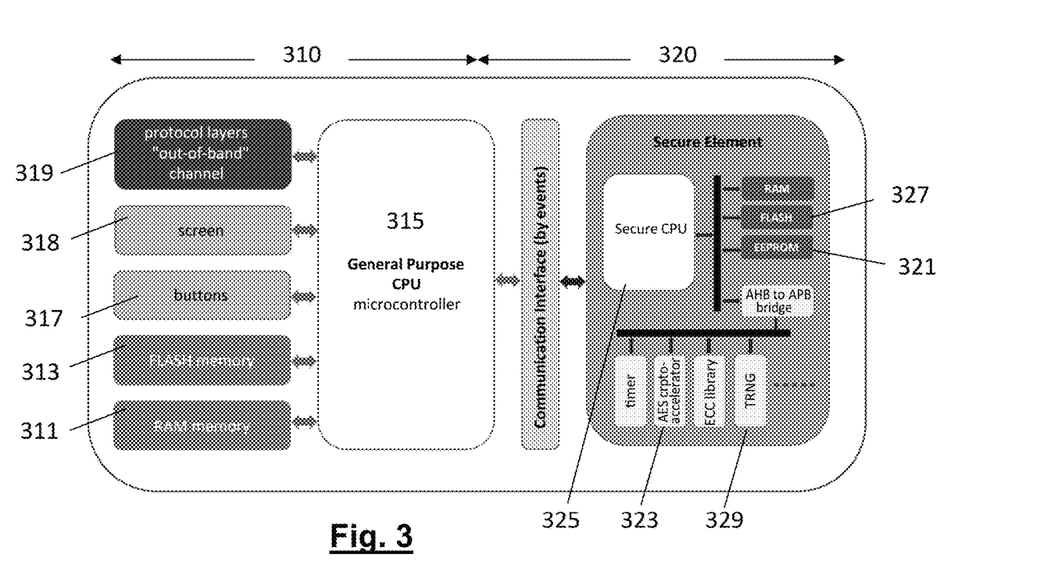
FIG. 3 schematically represents the inner architecture of the secure dongle of FIG. 2.

FIG. 3 schematically represents the inner architecture of the dongle of FIG. 2.

The architecture of the dongle is split into a non-secure area, 310, and a secure area, 320.

The non-secure area comprises a CPU, 315, a RAM memory, 311 and a flash memory, 313, in which the code monitoring the dongle is stored. The processor 315 manages the buttons, 317, the screen, 318, as well as the protocol stack of the auxiliary channel, 319.

In turn, the secure area is in the form of a secure hardware element SE (secure element), also called security hardware component, capable of storing the secret keys in a protected memory area (EEPROM), 321. It further comprises a secure processor, 325, capable of assessing cryptographic functions and primitives, in particular signing and encrypting data by means of these keys. Where appropriate, the secure element may comprise a hardware accelerator in the form of a special-purpose coprocessor (cryptoprocessor), 323. The cryptographic functions are recorded in a flash memory, 327, of the secure area.

Finally, the secure area comprises a generator of random numbers, TRNG (True Random Number Generator), 329, using a physical entropy source.

The secure hardware element, 320, has a high security level in order to be robust to physical and logical attacks, preferably an EAL5 security level. Preferably, the generator of random numbers meets the requirements of the standard AIS31.

Advantageously, access to the secure area is done only on interruption. For example, as we will see later on, a simultaneous press on the buttons 317, triggers reading of the secret keys stored in the EEPROM memory, 321, by the CPU 315.

Upon the first start-up of the dongle, the generator of random numbers generates a seed (master seed) and a series of passwords (pass phrase) is derived therefrom.

Figure 4:
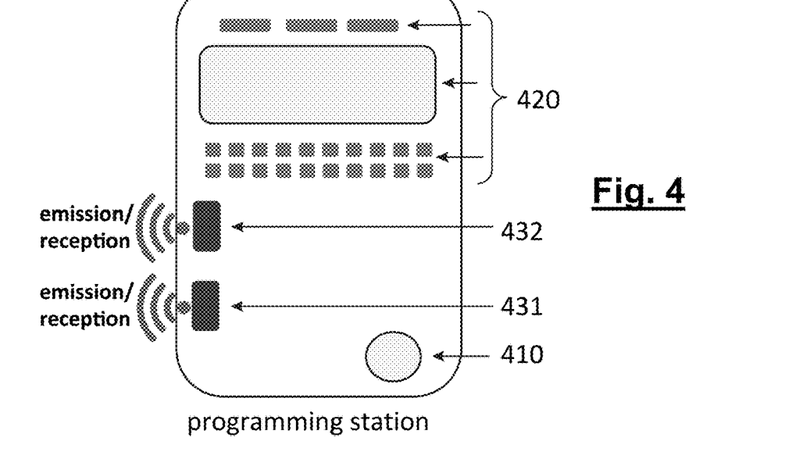
FIG. 4 represents a programming station allowing programming the connected objects of FIG. 1.

FIG. 4 represents a programming station allowing programming the connected objects of FIG. 1.

The programming station is powered by a battery and possibly a low-voltage power supply, 410, and is provided with a user interface (screen, menu keys, keyboard, etc.), 420 enabling the user to configure the mode of the station and send commands to the different connected objects. The screen allows presenting the menu of the functions and returning information to the user.

According to the first embodiment, the programming station is equipped with two distinct stations. The first antenna, 431, is used to communicate over the main channel in emission/reception with the connected objects. The second antenna, 432, is used to receive over the auxiliary channel messages from the secure dongle and, where appropriate, return back acknowledgements of receipt and identification messages.

Figure 5:
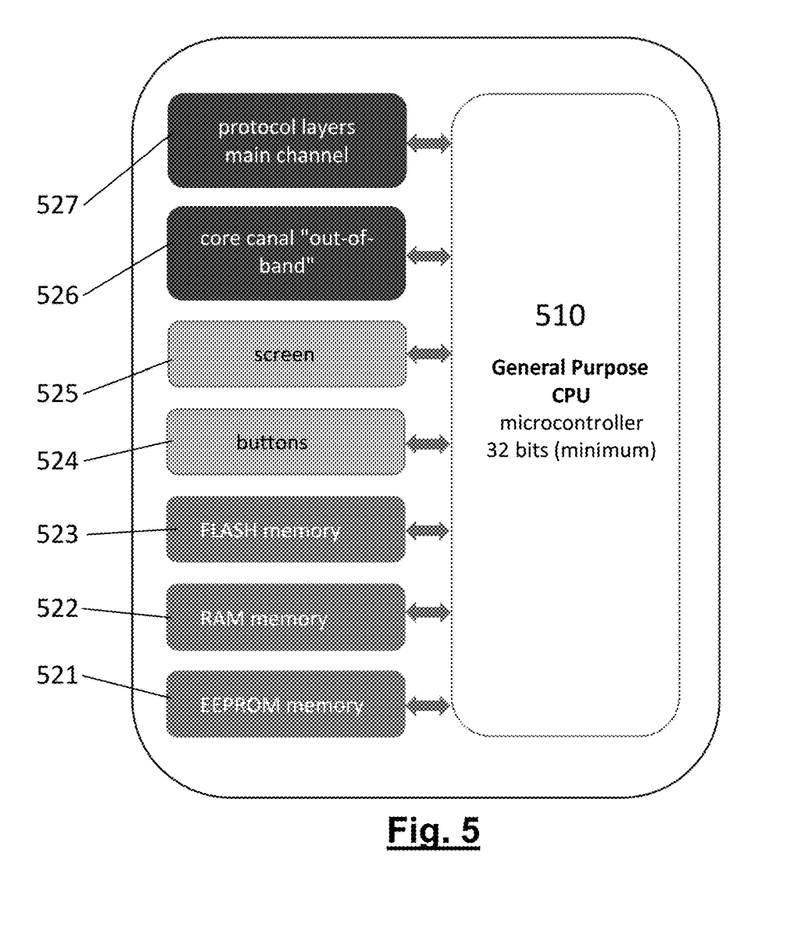
FIG. 5 schematically represents the inner architecture of the programming station of FIG. 4.

FIG. 5 schematically represents the inner architecture of the programming station of FIG. 4.

The programming station comprises a microcontroller, 510, for example a 32-bit microcontroller, capable of assessing asymmetrical elliptic-curve cryptographic functions. The programming station is provided in its flash memory, 523, with a library of cryptographic primitives enabling it to compute standard elliptic-curve cryptographic functions: generation of an ephemeral pair of public/private keys, digital signature and ECDSA verification.

The microcontroller manages the buttons, 524, the screen, 525, as well as the layers of the protocol stacks of the auxiliary channel, 526, and of the main channel, 527.

Unlike the dongle, the programming station does not comprise any secure hardware element. Indeed, as we will see later on, the secret keys are transferred to the programming station and stored in an EEPROM-type permanent memory, 521. Finally, the programming station is provided with a RAM memory, 522.

Figure 6:
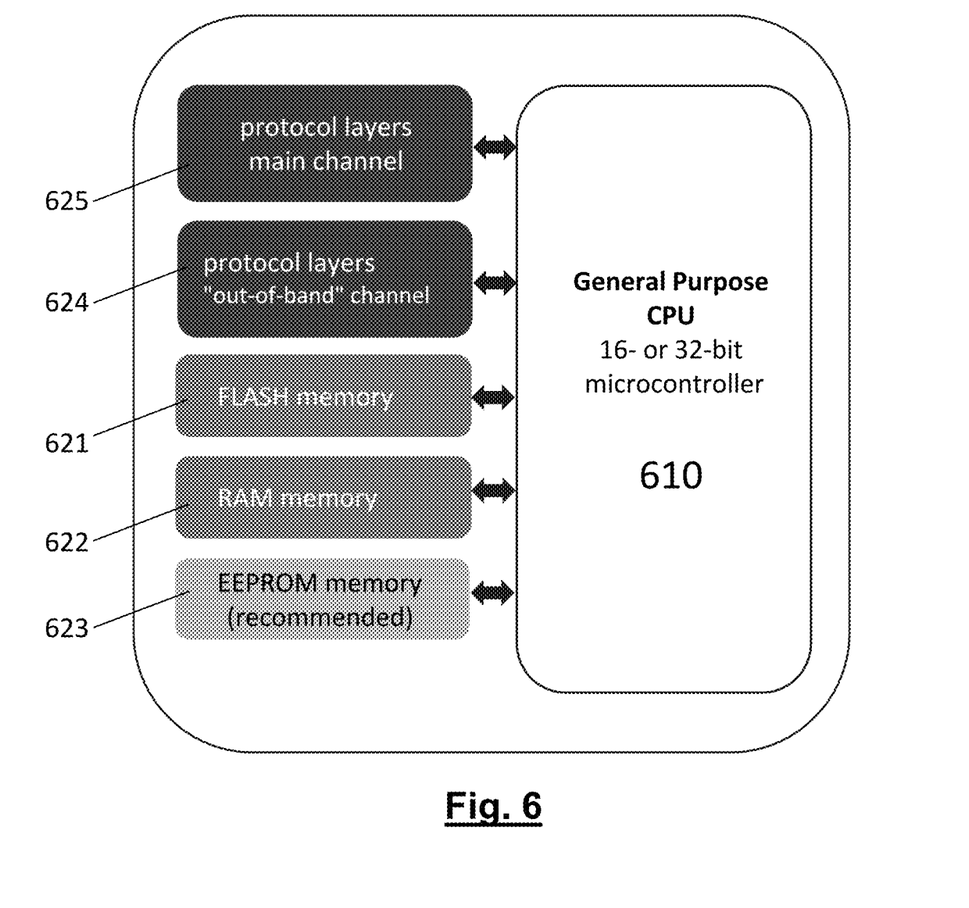
FIG. 6 schematically represents the inner architecture of a connected object in the network of FIG. 1.

FIG. 6 schematically represents the inner architecture of a connected object in the network of FIG. 1.

The connected objects have a simple architecture involving little hardware resources. They include a microcontroller (16-bit or 32-bit), 610, a flash memory, 621, in which the operating code is stored, a RAM memory, 622, and, where appropriate, an EEPROM memory, 623, secret keys supplied by the dongle could be permanently stored. The code comprises functions allowing verifying an ECDSA digital signature from a public key contained in a digital certificate, so as to be able to authenticate the secure dongle, as described later on.

The microcontroller manages the layers of the protocol stacks of the auxiliary channel, 624, and of the main channel, 625, like in the programming station.

According to the first embodiment, each of the connected objects is equipped with two distinct antennas, the first antenna being used to communicate in emission/reception over the main channel with the programming station as well as with the gateway, the second antenna being used to receive over the auxiliary channel messages from the secure dongle and, where appropriate, return back acknowledgements of receipt and identification messages.

The method for provisioning keys in the network comprises a first phase in which the dongle and the different nodes of the network authenticate and mutually identify themselves and a second phase in which the dongle securely distributes secret keys to the different nodes of the network. These two phases are followed by a third phase of discovering the nodes and forming the network by the programming station. Only the second phase depends on the embodiment, the first and third phases being common to both embodiments.

Figure 7:
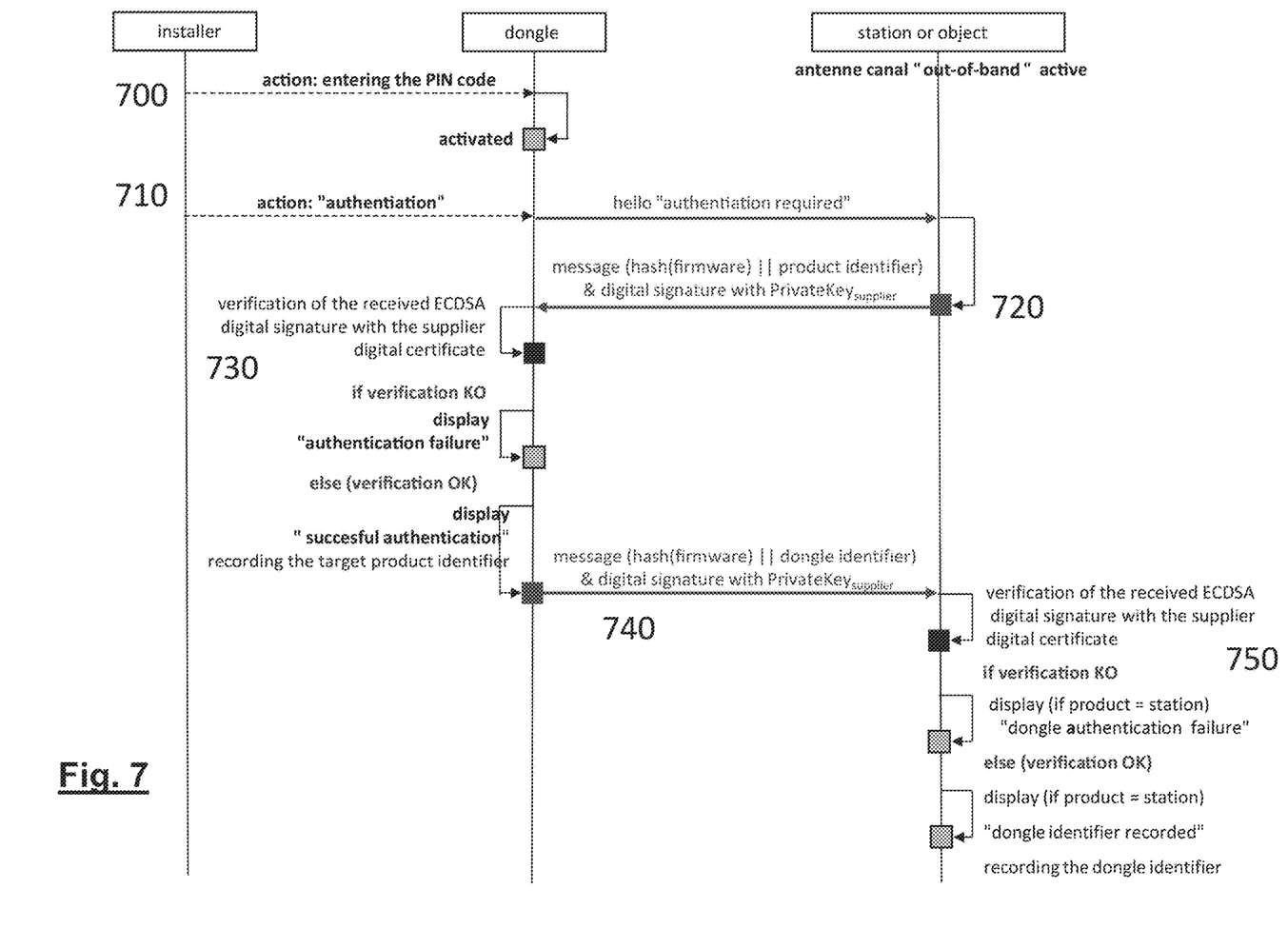
FIG. 7 schematically represents a phase of authentication and mutual identification between the secure dongle and a node of the network.

FIG. 7 schematically represents a phase of authentication and mutual identification between the secure dongle and the different nodes of the network.

It should be noted beforehand that each node of the network (programming station, connected object, gateway) has a unique identifier assigned thereto by the manufacturer of the hardware. Moreover, the embedded binary code (firmware) in each of the nodes is hashed by means of a hash function (for example SHA-1, SHA256, Keccak). The result of hashing is concatenated with the identifier of the node and the whole is then signed with the private key of the manufacturer, for example by means of the ECDSA algorithm. The concatenated set and the signature thus obtained, called digital signature of the node, are stored with the binary code embedded in the flash memory of the node (in other words all computations are performed and stored upon manufacture of the node). Each node also embeds the digital certificate of the manufacturer and is therefore provided with the public key associated to the private key that has been used for the signature.

In a prior step, 700, the installer accesses the controls of the dongle by entering a password or a confidential code (PIN code).

In a first step 710, the dongle sends, via the auxiliary channel, a request for authentication to the node (programming station, connected object).

The latter returns back, in 720, over the auxiliary channel, an authentication message comprising the hash of its firmware, concatenated with its identifier, as well as the digital signature of the node, i.e. the signature of the hash of the firmware concatenated with the identifier of the node.

Afterwards, in 730, the dongle verifies by means of the ECDSA verification algorithm, that the digital signature is actually correct using the public key of the manufacturer. The public key needed to perform this verification is contained in the digital certificate of the manufacturer, embedded in the dongle.

If the verification of the digital signature is conclusive, the node is authenticated, its identifier is stored as such in the EEPROM memory of the secure hardware element and the success of the authentication is signalled, for example by means of a message displayed on the screen of the dongle or a luminous/audible signal. It should be noted that this verification takes place only once, when the network is deployed, or else when a new node is added. Before proceeding with this verification, the dongle verifies that the identifier is not already in its EEPROM memory. If so, the verification of the digital signature, costly in terms of computations, is omitted.

If the verification of the digital signature fails, an authentication failure message is displayed on the screen of the dongle.

If the signature verification has been conclusive or the node has been already authenticated, the dongle, in turn, transmits, in 740, an authentication message to the node. This message comprises a hash of the binary code (firmware) embedded in the dongle, concatenated with its identifier, the concatenated set being then signed with the private key of the manufacturer. The obtained signature is stored with the binary code embedded in the flash memory of the dongle (in other words these computations are performed upon manufacture).

In turn, the node verifies, in 750, by means of the ECDSA verification algorithm, that the digital signature is actually correct using the public key of the manufacturer. The public key needed to perform this verification is contained in the digital certificate of the manufacturer, embedded in the node.

The success or the failure of this verification is signalled to the installer, by an audible and/or luminous signal.

In case of success of the verification, the identifier of the dongle is stored in the EEPROM memory of the node.

It should be noted that the failure of the authentication of the node or of the dongle could originate from the fact that the public key certificate stored in either one is obsolete. For this reason, the dongle preferably performs the signature verification at first. Thus, it could try several certificate versions (and therefore several public keys), to verify the digital signature of the node. If the dongle is provided with a plurality of digital signatures associated to different certificate versions, in other words if its memory contains the signatures (of the concatenated set formed by the hash of its firmware and its identifier) by means of the private keys corresponding to the versioned public keys, it could transmit to the node (at step 740) that one associated to the version of the certificate that has enabled it to authenticate the node (at step 730).

Once the authentication and mutual identification phase is successfully performed, the secure dongle securely transmits a set of secret keys to the programming station.

This set of secret keys comprises a first secret key ConfN used to encrypt information exchanged over the main channel and a second secret key, AuthN used to authenticate all of the nodes belonging to the network. Where appropriate, an initialisation vector or nonce IV will also be transmitted as a parameter of the encryption algorithm (AES for example).

Figure 8:
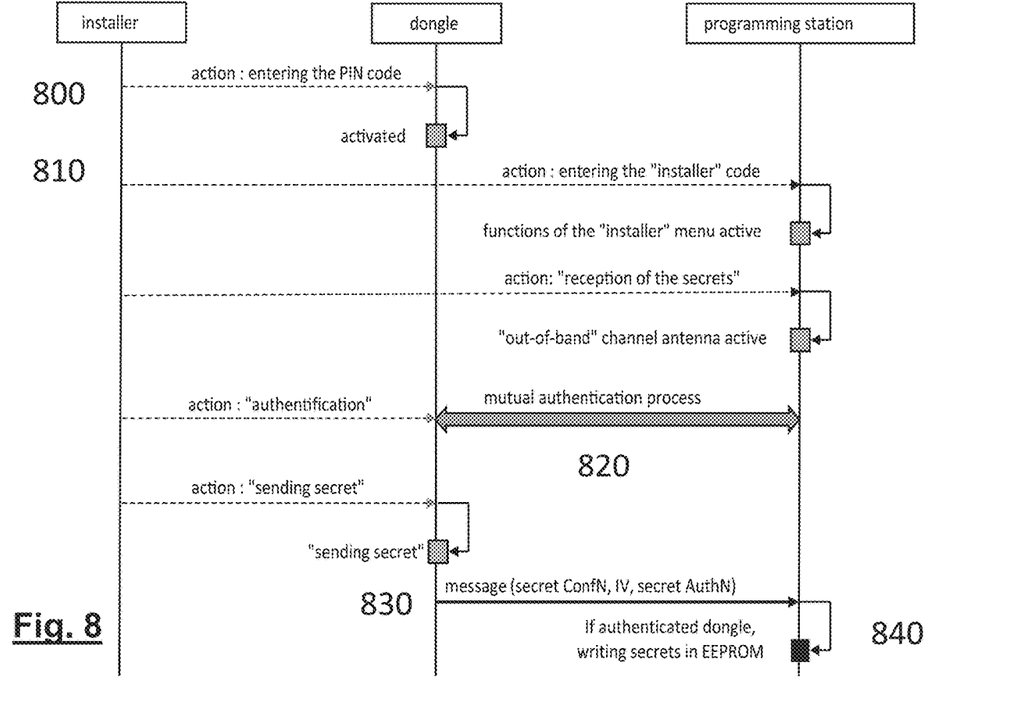
FIG. 8 schematically represents a step of transmission of secret keys by the secure dongle to the programming station, in the context of a first embodiment of the invention.

FIG. 8 schematically represents a phase of transmitting secret keys by the secure dongle to the programming station, in the context of a first embodiment of the invention.

In this embodiment, it is recalled that the transmission is done by means of an auxiliary channel based on a physical layer distinct from that of the main channel. The confidentiality of the transmission between the dongle and the nodes of the network is guaranteed by the short range of the propagation over the auxiliary channel.

In a prior step, 800, the installer accesses the controls of the dongle by introducing his password or PIN code.

At step 810, after having entered his installer code, he configures the programming station in an "installation" mode, for example by selecting this mode in a drop-down menu and then activates the "reception of the secret keys" function in the installation sub-menu. The activation of this function switches the emitter/receiver of the programming station in the reception mode to the antenna of the auxiliary channel for a time period with a predetermined duration (for example a few minutes).

In 820, the phase of authentication and mutual identification, herein between the dongle and the programming station, is represented as a reminder.

At step 830, the installer triggers the transmission of all secret keys by the dongle, for example by simultaneously pressing on the buttons 317 represented in FIG. 3. The secret keys are received by the programming station and stored in its EEPROM in 840 if the dongle has been successfully identified in the authentication phase, 820.

Figure 9:
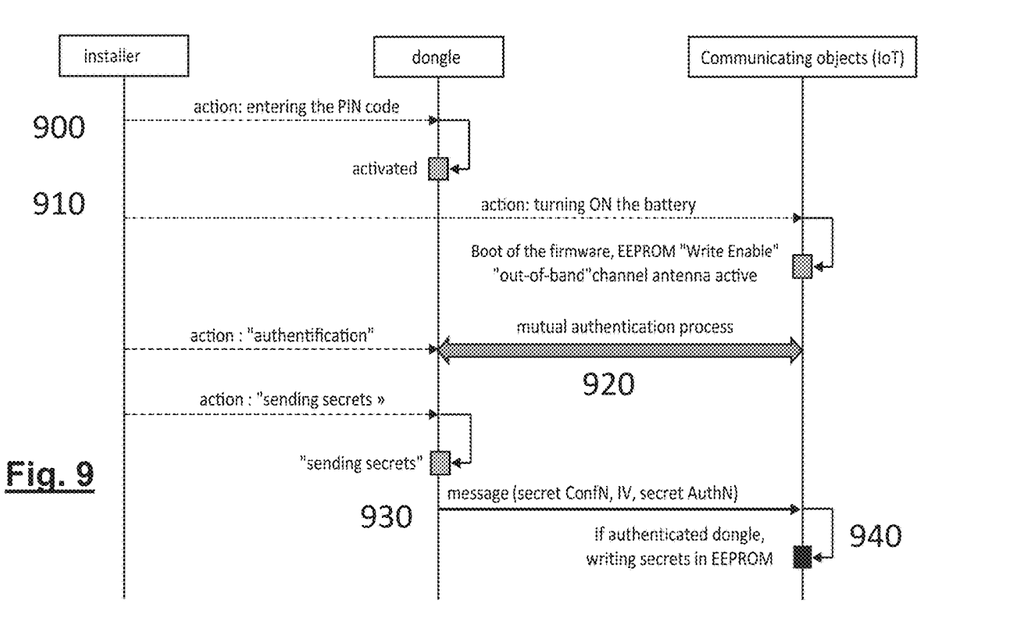
FIG. 9 schematically represents a step of transmission of secret keys by the secure dongle to a connected object, in the context of the first embodiment of the invention.

FIG. 9 schematically represents a phase of transmission of secret keys by the secure dongle to a connected object, in the context of the first embodiment of the invention.

This transmission phase is launched upon initialisation of the connected object, in particular upon first start-up (switching ON the cell). The EEPROM memory of the connected object is then automatically in the write enable mode (write enable) and the embedded code (firmware) starts execution thereof. The antenna of the object is automatically switched to the auxiliary channel using a short-range propagation.

In a prior step, 900, the installer accesses the controls of the dongle by entering a password or a confidential code (PIN code).

In 910, he then initialises the connected object for example by turning it on and places the dongle proximate to the considered object.

In 920, the phase of authentication and mutual identification between the dongle and the connected object has been recalled.

At step 930, the installer triggers the transmission of all secret keys by the dongle, for example by simultaneously pressing on the button 317 of the dongle represented in FIG. 3. The secret keys are received by the connected object and stored in its EEPROM in 940 if the dongle has been successfully identified in the authentication phase 920. When the secret keys have been saved in memory, the connected object signals it by means of an audible/luminous signal (for example a green LED).

Once the keys are saved, the antenna of the connected object is automatically switched to the main channel.

The secret key transmission process is repeated for each of the connected objects intended to be part of the network. Afterwards, the connected objects thus provisioned are deployed on site.

Figure 10:
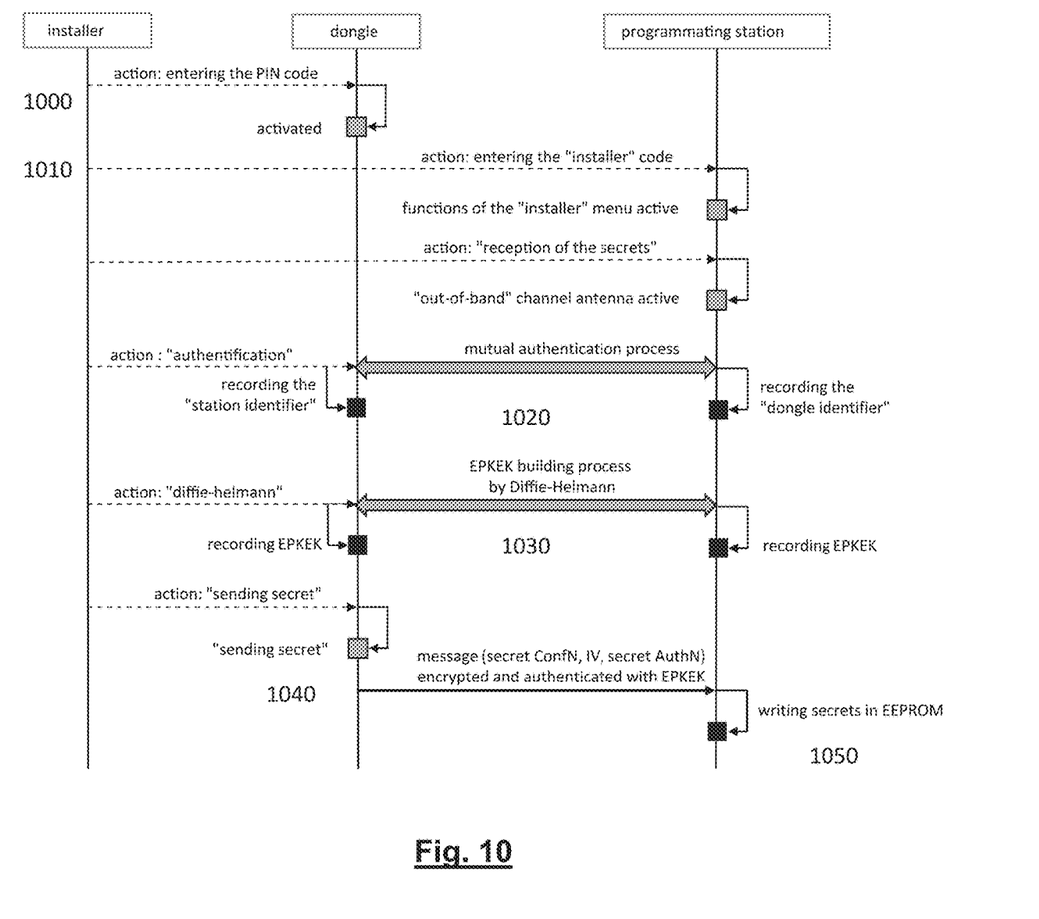
FIG. 10 schematically represents a step of transmission of secret keys by the secure dongle to the programming station, in the context of a second embodiment of the invention.

FIG. 10 schematically represents a step of transmission of secret keys by the secure dongle to the programming station, in the context of a second embodiment of the invention.

In this second embodiment, the transmission of the secrets is secured by means of an ephemeral session key, EPKEK (Ephemeral Partial Key Encryption Key), a symmetrical key obtained through a Diffie-Hellmann exchange between the dongle and the programming station. It should be noted that this ephemeral session key construction does not involve the connected objects. Thus, only the dongle and the programming station should embed asymmetrical cryptographic primitives.

Steps 1000, 1010, 1020 are respectively identical to steps 800, 810, 820 described with reference to FIG. 8 for the first embodiment.

At step 1030, the dongle and the programming station use a Diffie-Hellmann key exchange protocol to build a symmetrical session key, EPKEK.

At step 1040, the installer triggers the transmission of all secret keys by the dongle in the secure mode, for example by simultaneously pressing on the buttons 317 of the dongle represented in FIG. 3. The secret keys are encrypted by means of the symmetrical session key, EPKEK, before being transmitted to the programming station.

At step 1050, the secret keys thus encrypted are received by the programming station, decrypted by means of the key EPKEK, and then stored in its EEPROM.

Figure 11:
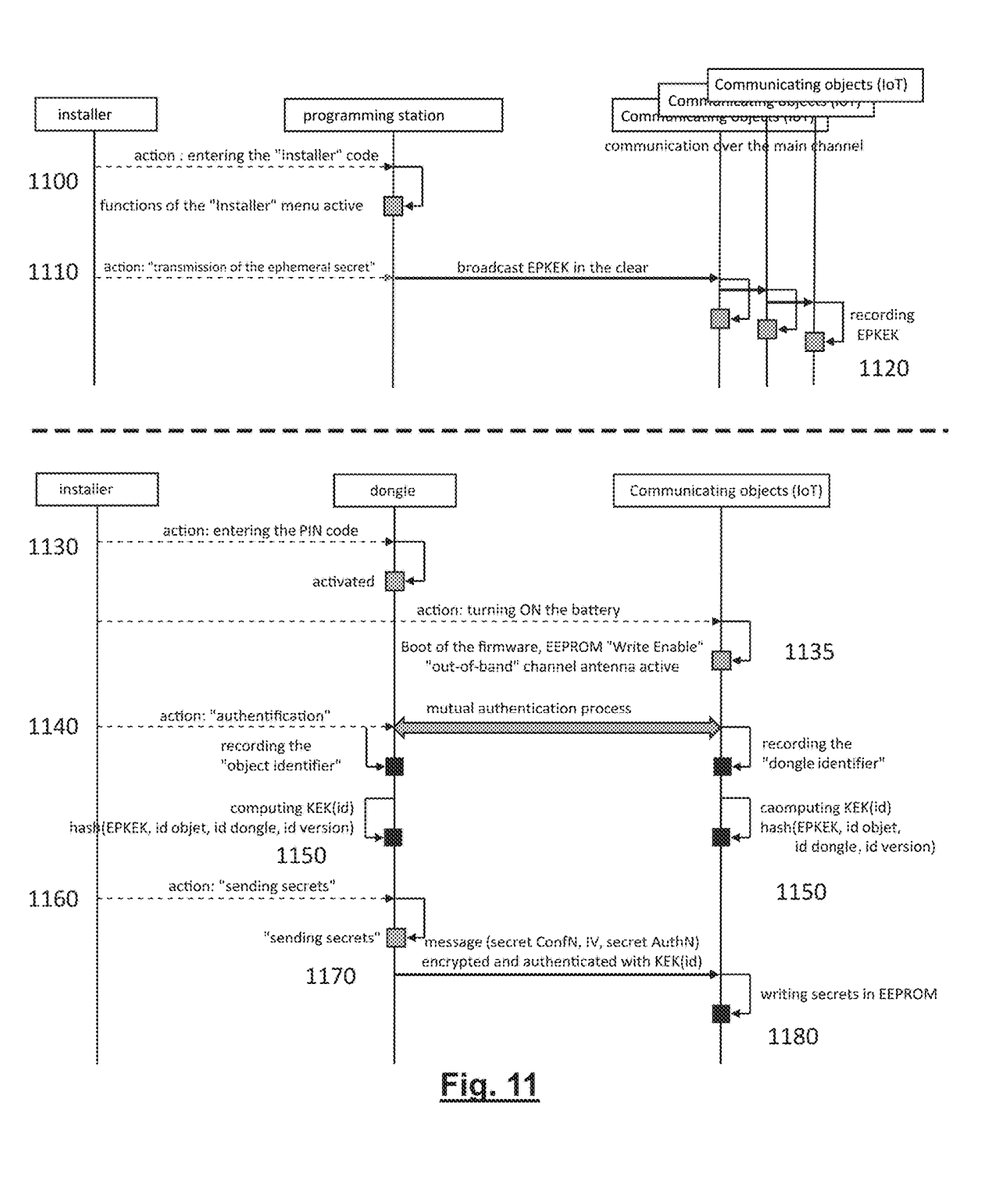
FIG. 11 schematically represents a step of transmission of secret keys by the secure dongle to a connected object, in the context of the second embodiment of the invention.

FIG. 11 schematically represents a phase of distributing secret keys to the connected nodes by the dongle, in the context of the second embodiment of the invention.

Firstly, as represented in the upper portion of the figure, the programming station broadcasts the session key to all connected objects. More specifically, after having entered his confidential code in 1100 on the programming station, the installer orders in 1110 the broadcast of the session key to all connected objects. This broadcast being carried out in the clear over the main channel, the session key is not secret. It is recorded in the EEPROM memory of each connected object in 1120.

Secondly, as represented in the lower portion of the figure, after the installer has introduced his confidential code in the dongle in 1130 and turned on the battery of each connected object in 1135, he triggers in 1140 a phase of authentication and mutual identification between the dongle and the connected objects, as described in connection with the first embodiment. At the end of this phase, the dongle has recorded in its EEPROM memory the identifiers of the connected objects and, conversely, each connected object has recorded the identifier of the dongle in its EEPROM memory. Furthermore, when the dongle has successfully authenticated the connected objects of the network, the latter knows the version of the digital certificate embedded in these objects.

Unlike the first embodiment, each pair formed by the dongle and a node of the network (programming station or connected object) then computes, in 1150, a symmetrical link key, KEK(Ido,Idd) where Ido is the identifier of the connected object and Idd is the identifier of the dongle. More specifically, the dongle and the node compute the link key, each independently:

$$KEK(Ido,Idd)=\text{Hash}(EPKEK\|Ido\|Idd\|Idv) \qquad \text{[Math. 1]}$$

where Idv is the identifier of the version of the digital certificate of the public key of the manufacturer, associated to the private key having been used to sign the code embedded in the connected object. It should be noted that the identifiers Ido, Idd and My are known by both the dongle and the connected object, at the end of the authentication and mutual identification phase. Where appropriate, the link key could be truncated into a predetermined number of bits (for example the first 128 bits) of the hash result.

Upon request of the installer in 1160 (materialised by a press on both buttons 317), the dongle transmits in 1170, over the auxiliary channel, all secret keys in the form of a message encoded by the link key KEK(Ido,Idd). Of course, this operation is repeated for each connected object of the network. After reception of the message and decryption, the secret keys are then recorded in the EEPROM memory of the connected object in 1180.

Once the secret keys are broadcast to the programming station and to the connected objects, the programming station launches a phase of discovering the network in the secure mode. This phase is identical whether in the first or the second embodiment.

Figure 12:
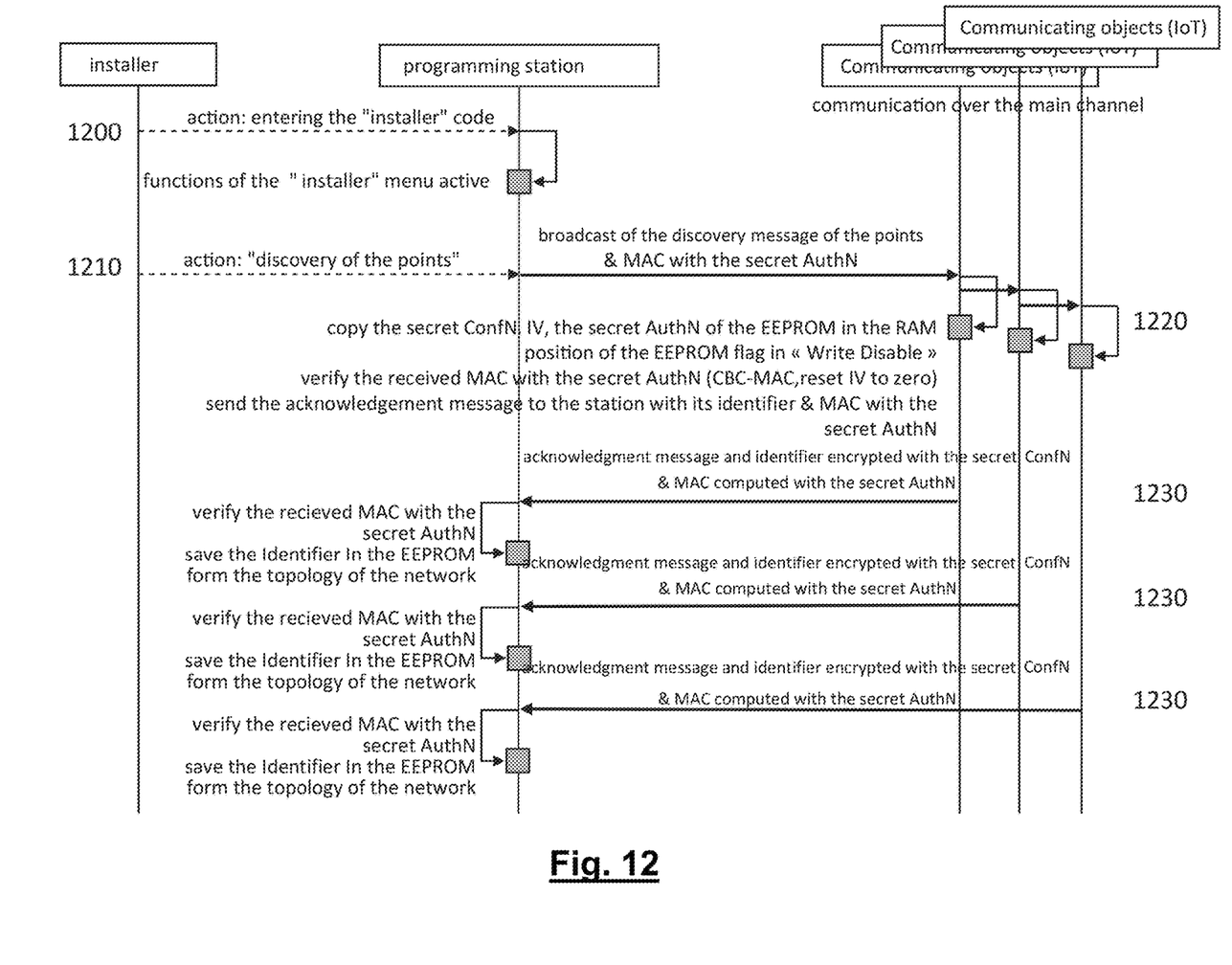
FIG. 12 schematically represents a phase of discovering the network of connected objects by the programming station.

FIG. 12 schematically represents a phase of discovering the network of connected objects by the programming station.

After having input his confidential code in 1200 on the programming station, the installer orders the latter in 1210 to discover the nodes of the network. The programming station then broadcasts, over the main channel, a message for discovering the nodes of the network in the secure mode. This discovery message is authenticated by generating an authentication code of this message or MAC (Message Authentication Code), for example by means of the CBC-MAC algorithm or the HMAC algorithm, starting from the secret key AuthN. The discovery message and its MAC code are broadcast to all connected nodes.

When a connected object receives said discovery message with its authentication code AuthN, the latter propagates it to the neighbouring nodes, in 1220. Afterwards, it reads the secret keys AuthN and ConfN in its EEPROM memory and verifies the authentication code of the discovery message using the secret key, AuthN.

If the authentication code is successfully verified (in other words if the discovery message has actually been generated by the programming station of the network), the connected object sends back to the programming station an acknowledgment message including its identifier, IdoIdo, in 1230. This acknowledgment message is authenticated by generating an authentication code MAC using the secret key, AuthN, then encrypted using the secret key ConfN.

Upon reception of an acknowledgment message, the programming station decrypts the latter with the secret key ConfN, then verifies with the secret key AuthN that it actually originates from a node of the network. When the acknowledgment message has been actually authenticated by the programming station, the latter saves the identifier of the connected object having replied, Ido. In other words, only the connected objects, configured beforehand using the dongle, could be incorporated in the network. Finally, the programming station records the topology of its network.

The present method for provisioning keys in a network of connected objects allows adding a new object (sensor or actuator for example) after the network has been initially deployed. For this purpose, the installer should be provided with the dongle having been used during the initial deployment. For example, in the context of the first embodiment, it is possible to proceed as explained with reference to FIG. 9. In other words, after introduction of the PIN code in the dongle and start-up of the connected object to be added, an authentication and mutual identification phase is launched. The secret keys stored in the dongle are transmitted to the connected object via the auxiliary channel. After recording the secret keys in the EEPROM memory of the object, the latter switches its emitter/receiver to the main channel while keeping the EEPROM memory in the write mode (Write Enable).

The invention claimed is:

1. A method for provisioning keys in a system including a wireless network whose nodes comprise a programming station and a plurality of connected objects, wherein the system includes a terminal including a secure hardware element in which secret keys are stored, the nodes of the network being configured to communicate over a main channel and over an auxiliary channel, distinct from the main channel, said terminal being configured to communicate with the different nodes of the network only over the auxiliary channel, said method comprising:

performing a first phase during which the terminal and each node of the network authenticate and mutually identify themselves via the auxiliary channel with a public key of a manufacturer;

performing a second phase during which the terminal securely distributes a set of secret keys to the different nodes of the network, said set of secret keys comprising a first secret key configured to authenticate the nodes belonging to the network and a second secret key configured to encrypt exchanges over the main channel;

performing a third phase during which the programming station discovers the network with a discovery message broadcast to the connected objects, the discovery message being authenticated with the first secret key and, in case of a successful authentication of said message by a particular connected object of the plurality of connected objects, sending of an acknowledgment message to the programming station, the acknowledgement message being encrypted by the second secret key.

2. The method for provisioning keys in the wireless network according to claim 1, wherein each node is equipped with a first antenna configured to emit and receive over a principal channel, and with a second antenna configured to emit and receive over the auxiliary channel, propagation over the auxiliary channel having a range shorter than propagation over the main channel.

3. The method for provisioning keys in the wireless network according to claim 2, wherein the terminal, for each node of the network, is provided with a unique identifier of the manufacturer and embeds a binary code, said binary code being hashed with a hash function, a result of the hashing being concatenated with said unique identifier of the manufacturer, the whole a result of the concatenation being signed by a private key corresponding to the public key of the manufacturer, and the signed result being stored in the terminal, for each node, in a form of a signed identifier, and in the first phase, the terminal transmits a signed identifier of the terminal to each node of the network, the node authenticating the terminal from the signed identifier of the terminal and from said public key of the manufacturer, and each node transmits a signed identifier of the node to the terminal, the terminal authenticating each node from the signed identifier of the node and from said public key of the manufacturer.

4. The method for provisioning keys in the wireless network according to claim 3, wherein in case of success of authentication of the terminal by a particular node, the identifier of the terminal is stored in an EEPROM memory of the particular node.

5. The method for provisioning keys in the wireless network according to claim 4, wherein, in the second phase, the terminal transmits, via the auxiliary channel, said set of secret keys to each node and, when the identifier of the terminal is stored in the particular node, the particular note stores said set of secret keys in the EEPROM memory of the particular node and switches an emitter/receiver of the particular node to the main channel.

6. The method for provisioning keys in the wireless network according to claim 1, wherein the auxiliary channel between the programming station and each node is encrypted with a symmetrical link key obtained from an ephemeral session key, of the identifier of the terminal as well as the identifier of said node.

7. The method for provisioning keys in the wireless network according to claim 6, wherein the ephemeral session key is obtained with a Diffie-Hellman exchange between the terminal and the programming station.

8. The method for provisioning keys in the wireless network according to claim 7, wherein in the second phase, the terminal transmits, in a first step, said set of secret keys to the programming station, said set of secret keys being encrypted with the ephemeral session key.

9. The method for provisioning keys in the wireless network according to claim 8, wherein, in the second phase, the terminal transmits, in a second step, said set of secret keys to each node of the nodes, said set of secret keys being encrypted with the symmetrical link key associated to the terminal and to said node, said symmetrical link key being obtained as a hash of the ephemeral key concatenated with the identifier of the terminal and with the identifier of the node.

10. The method for provisioning keys in the wireless network according to claim 1, wherein, in the third phase, when a particular node of the nodes successfully authenticates a discovery message emitted by the programming station, the particular node sends to the programming station the acknowledgement message signed by the second secret key, the programming station then storing the identifier of the particular connected object in a local memory after having decrypted the acknowledgment message with the second secret key.

* * * * *